United States Patent
Munday et al.

(10) Patent No.: US 9,249,054 B2
(45) Date of Patent: Feb. 2, 2016

(54) CONTAINMENT ELEMENT COMPRISING MULLITE OR A POLYMORPH OF MULLITE, ASSEMBLY COMPRISING SAME, METHOD OF MAKING SAME AND METHOD OF USING SAME

(75) Inventors: Mark Gregory Munday, Harwell (GB); Charles Stephan Montross, Portland, OR (US)

(73) Assignees: Element Six Limited, County Clare (IE); Element Six Abrasives S.A., Luxembourg (LU)

( * ) Notice: Subject to any disclaimer, the term of this patent is extended or adjusted under 35 U.S.C. 154(b) by 20 days.

(21) Appl. No.: 14/009,453

(22) PCT Filed: Apr. 5, 2012

(86) PCT No.: PCT/EP2012/056375
§ 371 (c)(1),
(2), (4) Date: Dec. 18, 2013

(87) PCT Pub. No.: WO2012/136821
PCT Pub. Date: Oct. 11, 2012

(65) Prior Publication Data
US 2014/0128244 A1    May 8, 2014

Related U.S. Application Data

(60) Provisional application No. 61/473,336, filed on Apr. 8, 2011.

(30) Foreign Application Priority Data

Apr. 8, 2011   (GB) .................................... 1105957.3

(51) Int. Cl.
*C04B 33/00*       (2006.01)
*C04B 33/13*       (2006.01)
(Continued)

(52) U.S. Cl.
CPC ................. *C04B 33/13* (2013.01); *B01J 3/065* (2013.01); *B01J 3/067* (2013.01); *B30B 11/004* (2013.01);
(Continued)

(58) Field of Classification Search
CPC ...... C04B 14/042; C04B 35/16; C04B 35/18; C04B 35/185
USPC .......................... 501/141, 128, 129, 130, 131
See application file for complete search history.

(56) References Cited

U.S. PATENT DOCUMENTS 5,858,525 A   1/1999   Carter et al.
6,090,315 A * 7/2000   Bai .............................. 252/601
(Continued)

FOREIGN PATENT DOCUMENTS

CN   101633579       1/2010
DE      275580 A3    1/1990
(Continued)

OTHER PUBLICATIONS

United Kingdom Patent Application No. GB1105957.3, Combined Search and Examination Report mailed Aug. 8, 2011, 7 pages.
(Continued)

*Primary Examiner* — Noah Wiese
(74) *Attorney, Agent, or Firm* — Dean W. Russell; Clark F. Weight; Kilpatrick Townsend & Stockton LLP

(57) ABSTRACT

A containment element for a pressure containment assembly, comprising mullite or a polymorph of mullite.

21 Claims, 1 Drawing Sheet

Figure 1:
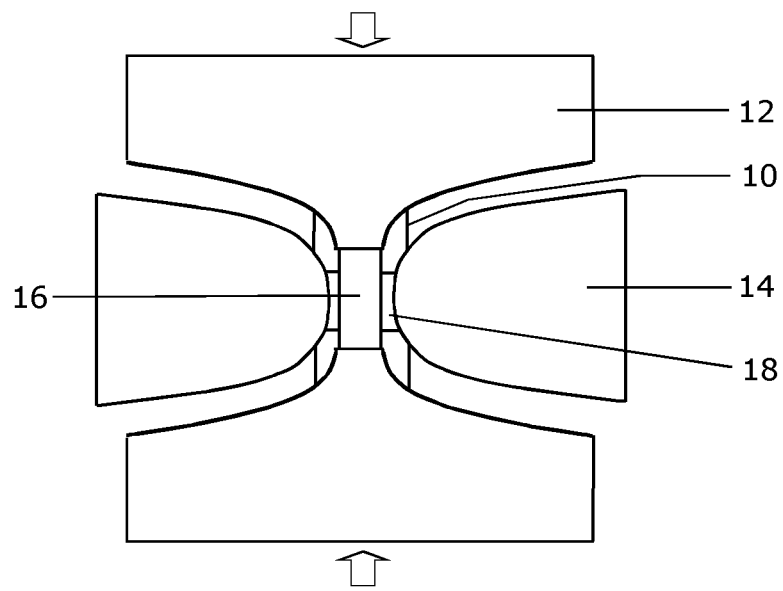

(51) Int. Cl.
    *B01J 3/06*         (2006.01)
    *B30B 11/00*      (2006.01)
    *C04B 33/04*      (2006.01)
    *C04B 35/185*     (2006.01)
    *C04B 35/20*      (2006.01)
    *C04B 35/63*      (2006.01)
    *C04B 35/645*     (2006.01)

(52) U.S. Cl.
    CPC .............. *C04B 33/04* (2013.01); *C04B 35/185* (2013.01); *C04B 35/20* (2013.01); *C04B 35/6303* (2013.01); *C04B 35/6316* (2013.01); *C04B 35/645* (2013.01); *B01J 2203/066* (2013.01); *B01J 2203/0655* (2013.01); *C04B 2235/349* (2013.01); *C04B 2235/3418* (2013.01); *C04B 2235/3463* (2013.01); *C04B 2235/36* (2013.01); *C04B 2235/604* (2013.01); *C04B 2235/80* (2013.01)

(56) References Cited

U.S. PATENT DOCUMENTS 6,338,754 B1    1/2002    Cannon et al.
2006/0032431 A1*  2/2006    Sung ............................... 117/68

FOREIGN PATENT DOCUMENTS

| | | |
|---|---|---|
| DE | 202009010307 U1 | 5/2010 |
| EP | 1930061 A2 | 6/2008 |
| EP | 2138475 A1 | 12/2009 |
| GB | 1069801 | 5/1967 |
| GB | 1203130 | 8/1970 |
| GB | 1437808 | 6/1976 |
| JP | 6048481 | 3/1985 |
| JP | S6271531 | 4/1987 |
| JP | 63297923 | 12/1988 |
| JP | H03106982 | 5/1991 |
| WO | 9931027 A1 | 6/1999 |

OTHER PUBLICATIONS

International Patent Application No. PCT/EP2012/056375, International Search Report and Written Opinion mailed Jun. 21, 2012, 10 pages.
United Kingdom Patent Application No. GB1206072.9, Combined Search and Examination Report mailed Jul. 24, 2012, 7 pages.
International Patent Application No. PCT/EP2012/056375, International Preliminary Report on Patentability mailed Oct. 8, 2013, 7 pages.
Chinese Patent Application No. 201280024704.1, Office Action mailed May 11, 2015, 16 pages.

* cited by examiner

CONTAINMENT ELEMENT COMPRISING MULLITE OR A POLYMORPH OF MULLITE, ASSEMBLY COMPRISING SAME, METHOD OF MAKING SAME AND METHOD OF USING SAME

CROSS REFERENCE TO RELATED APPLICATIONS

This application is the U.S. national phase of International Application No. PCT/EP2012/056375 filed on Apr. 5, 2012, and published in English on Oct. 11, 2012 as International Publication No. WO 2012/136821 A1, which application claims priority to Great Britain Patent Application No. 1105957.3 filed on Apr. 8, 2011 and U.S. Provisional Application No. 61/473,336 filed on Apr. 8, 2011, the contents of all of which are incorporated herein by reference.

This disclosure relates generally to a containment element for a pressure containment assembly, particularly but not exclusively for containing matter at an ultra-high pressure, a pressure containment assembly comprising same, a method of making same and a method of using same.

U.S. Pat. No. 6,338,754 discloses a synthetic gasket material made by combining talc powder and garnet powder.

U.S. Pat. No. 5,858,525 discloses synthetic gasket material including a major proportion of clay mineral powder having sufficient lubricity to flow in a high-pressure press, and a minor proportion of at least one hard material powder having a sufficiently greater hardness than the clay mineral to retard flow of the clay mineral and form a gasket seal during pressing in a high-pressure press.

A mined mineral called pyrophyllite, which comprises aluminium silicate hydroxide ($Al_2Si_4O_{10}(OH)$) has been used for containment vessels at ultra-high pressure and high temperatures. However, suitable sources of the mineral are limited. Pyrophyllite undergoes phase changes at ultra-high pressure and or high temperature.

There is a need for containment elements and containment assemblies, particularly but not exclusively for use in containing matter at ultra-high pressure, comprising materials that undergo relatively less phase change at elevated pressure, possibly in combination with elevated temperature.

Viewed from a first aspect there is provided a containment element for a pressure containment assembly comprising mullite and or a polymorph of mullite. The pressure containment assembly will be for containing matter in solid and or fluid state at elevated pressure.

Various combinations and arrangements are envisaged by this disclosure, for which the following are non-limiting, non-exhaustive examples.

The containment element may comprise at least about 10 weight percent mullite. The containment element may comprise at most about 90 weight percent or at most about 60 weight percent mullite.

The containment element may comprise talc, and or kaolinite, and or kyanite and or polymorphs of kaolinite or kyanite, and a binder material. The containment element may comprise at least about 5 weight percent or at least about 10 weight percent of silica or glassy phases. The containment element may comprise at most about 15 weight percent or at most about 10 weight percent silica, silicate compounds or other glassy phases, or it may be substantially free of silicate compounds.

The containment element may comprise composite material comprising at least about 20 weight percent talc, at least about 10 weight percent mullite and or at least about 5 weight percent kyanite.

The containment element may be substantially free from magnesium carbonate or precursor material for magnesium carbonate.

The pressure containment assembly may be suitable for containing matter in the solid and or liquid state at an ultra-high pressure at ambient or elevated temperature. The containment element will be according to this disclosure prior to the application of the ultra-high pressure.

The containment element may comprise a pressure containment vessel (some example arrangements of pressure containment assemblies may comprise a plurality of pressure containment vessels) and or the containment element may comprise a pressure sealing element. The containment element may comprise (or be) a seal element (or gasket), a thermal insulation element and or an electrical insulation element.

The containment element may be for use in a containment assembly for generating an ultra-high pressure and or containing matter at an ultra-high pressure. The containment assembly may be for containing matter at a pressure of at least about 1 GPa, at least about 5 GPa, at least about 7 GPa, at least about 8 GPa or at least about 10 GPa. The containment assembly may be for containing matter at a pressure of at least about 1 GPa and a temperature of at least about 1,000 degrees centigrade or at least about 2,000 degrees centigrade. The containment assembly may comprise (or be) a vessel for containing a reaction compact for synthesis or sintering of super-hard material and configured for use in an ultra-high pressure furnace. Example containment elements may be suitable for use with a belt-type, a cubic type, tetrahedral type, Walker type or other type of ultra-high pressure apparatus for containing matter in the solid and or liquid state at an ultra-high pressure.

The containment element may comprise grains of a first hard material having a first internal friction and grains of a second hard material having a second internal friction. The second hard material may be a different phase of the first hard material. The second material may promote the plasticity, handleability and or machinability of the containment element. The second material may promote plasticity, flowability and or pressure transmission at ultra-high pressure and or elevated temperature of at least about 900 degrees centigrade. The containment element may comprise cordierite, a material comprising magnesia, alumina and silicate compounds. The first material may comprise mullite.

Viewed from a second aspect there is provided a containment assembly (in assembled or unassembled form) for containing matter in solid and or fluid state at an ultra-high pressure, comprising a containment element according to this disclosure. The containment assembly may be for a belt type ultra-high pressure press, a cubic type ultra-high pressure press, a tetrahedral type ultra-pressure press, a Walker type press system or other type of ultra-high pressure press system.

The containment assembly may comprise a gasket. The containment assembly may comprise a vessel for containing a reaction compact for synthesis or sintering super-hard material. The containment assembly may comprise a press apparatus comprising a chamber for accommodating a capsule comprising a containment element according to this disclosure.

Viewed from a third aspect there is provided a method for subjecting a body to an ultra-high pressure and high temperature, the method including assembling the body into a capsule configured for accommodating the body and for insertion into a chamber of an ultra-high pressure furnace apparatus, in which the capsule comprises a containment element according to this disclosure.

Viewed from a fourth aspect there is provided a method of making a containment element according to this disclosure, including combining mullite grains with at least a second material to form a granular blend, and compacting the granular blend to provide a green body. The method may include treating the green body, for example to induce a phase change in the second material or to remove moisture from the green body. The method may include heat treating the green body. In one example, the second material may be a binder material for binding together the mullite grains. The second material may be talc and the method may include heat treating the green body to induce a phase change in the talc.

Figure 2:
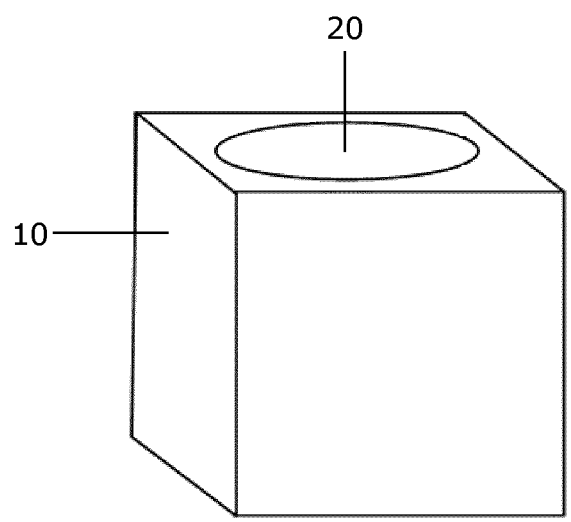

Non-limiting examples will be described below with reference to the accompanying drawings, of which FIG. 1 shows a cross section view of a schematic example of part of a belt-type assembly for generating an ultra-high pressure and high temperature in a reaction volume for synthesising diamond and cubic boron nitride; and FIG. 2 shows a perspective view of a schematic example of a gasket for a cubic-type apparatus for generating an ultra-high pressure and high temperature in a reaction volume for synthesising diamond and cubic boron nitride.

Mullite, which is also called porcelainite is a rare silicate mineral and can form the two stoichiometric forms $3Al_2O_3(2SiO_2)$ or $2Al_2O_3.SiO_2$. Mullite occurs in a platelet form and needle form.

Kaolinite ($Al_2Si_2O_5(OH)_4$) is a mineral that may be found in rock formations comprising kaolin.

Kyanite is a member of the aluminosilicate series, which also includes the polymorph andalusite and the polymorph sillimanite. Kyanite is strongly anisotropic and its hardness varies depending on its crystallographic direction. In Kyanite, this anisotropism can be considered an identifying characteristic. At temperatures above 1,100 degrees centigrade, kyanite decomposes into mullite and vitreous silica via the following reaction: $3(Al_2O_3.SiO_2) \rightarrow 3Al_2O_3.2SiO_2+SiO_2$. This transformation results in an expansion.

Talc, mullite, kaolinite and kyanite are naturally occurring minerals, or may be derived from naturally occurring minerals, and so may contain a proportion of other components and impurities. This disclosure is not limited to a specific source of these materials and so the specification of one or more of these minerals should be taken as referring to the substance itself together with its commonly occurring impurities and co-existing substances. Synthetic talc, mullite, kaolinite and or kyanyite are also envisaged by this disclosure.

Mullite (at least in the $3Al_2O_3(2SiO_2)$ stoichioteric form) was found to be suitable for use as a material for components of pressure containment assemblies for use at ultra-high pressure and temperature conditions.

With reference to FIG. 1, an example containment element in the form of a gasket 10 and or tube 18 may be used to contain a reaction compact 16 when the latter is compressed between an opposing pair of anvils 12 while supported radially by means of a circumferential containment die 14, using a belt-type ultra-high pressure, high temperature press. In some examples, the reaction compact 16 may comprise materials suitable for converting a source of carbon into diamond when subjected to a pressure of at least about 5.5 GPa and a temperature of at least about 1,250 degrees centigrade. In some examples, the reaction compact 16 may comprise a pre-sinter compact comprising grains of super-hard material such as diamond or cBN and material suitable for promoting the binding, sintering and or intergrowth of the super-hard grains to produce PCD or PCBN material. The reaction compact 16 is contained within a capsule comprising a tube 18. The reaction compact 16 may contain metal such as iron, cobalt and or nickel, which are examples of catalyst and or binder materials (or precursor materials for catalyst or binder materials) for promoting diamond synthesis or sintering, or compounds including lithium, aluminium and or titanium (or any of these elemental form) for promoting cBN synthesis or sintering. Catalyst material may be molten at the ultra-high pressure and temperature. In some example arrangements the tube 18 and or the gasket 10 may comprise mullite, kaonite and or kaolinite prior to being subjected to an ultra-high pressure (i.e. as assembled in preparation for the ultra-high pressure treatment). In some example arrangements the tube 18 and or the gasket 10 may comprise pyrophyllite and or talc. In some example arrangements, the capsule may comprise containment elements other than the tube 18, the other containment elements possibly comprising mullite, kaonite and or kaolinite prior to being subjected to an ultra-high pressure.

The pressure may be generated by driving the anvils 12 from opposite directions and thus squeezing the reaction compact 16, and the temperature may be generated by passing an electric current through the anvils 12 and the reaction compact 16 and or through heater elements (not shown) provided in the capsule. The gasket 10 has the purpose of containing the contents of the reaction volume as the pressure and temperature are increased from ambient levels, for a period at the ultra-high pressure and temperature, and then as the reaction volume is cooled. The dynamic loading on the gasket 10 both longitudinally and laterally is likely to vary considerably throughout the entire cycle.

FIG. 2 shows an example gasket 10 for a cubic-type apparatus (not shown) for generating an ultra-high pressure and high temperature in a reaction volume (not shown) inserted within a cavity 20 of the gasket 10. The gasket 10 may have the general external shape of a cube and may encapsulate the reaction volume in use.

A capsule for an ultra-high pressure press may comprise a plurality of cooperatively configured containment elements that in combination act to contain a body or fluid mass under pressure and possibly also at an elevated temperature. For example, a reaction compact for growing or sintering diamond or cBN crystals may be solid below the melting point of a catalyst material comprised therein and a liquid phase above the melting point of the catalyst material at an ultra-high pressure, and the capsule comprising the containment elements will need to contain the reaction compact in both states. In some examples, the materials should be selected for the various containment elements such as a gasket and or tube such that the materials undergo as little phase change as possible under the ultra-high pressure and high temperature conditions and maintain their key thermo-mechanical properties at these conditions.

In some example arrangements, an ultra-high pressure furnace and suitable capsule may be configured for generating a pressure of at least about 8 GPa or at least about 10 GPa in matter contained by the capsule. The matter may be in the solid or liquid state, or there may be both solid and liquid state matter within the capsule. The temperature of the matter may be ambient or elevated, such as at least about 1,000 degrees centigrade or at least about 2,000 degrees centigrade. Such arrangements are likely to benefit substantially from comprising at least one containment element according to this disclosure and may include a containment vessel and or a gasket according to this disclosure. While wanting not to be limited by a particular theory, this may be because of reduced phase change of the material constituents of the containment element, particularly mullite. Such phase change would likely be either endo- or exo-volumetric and affect the pressure generated within the contained matter.

Example containment elements may comprise a mixture of talc, kyanite and mullite. Kyanite and Mullite are hard materials having high internal friction and different responses to high pressure and high temperature conditions. The containment element may include a binder material. Examples of containment elements may comprise different amounts and proportions of mullite and kyanite, which is expected to result in different properties. The properties of containment elements can be determined by altering the proportions of talc, kyanite and mullite. In addition, the size distributions of the mullite and kyanite powders may be altered to modify the properties of the containment element.

In some examples, the plasticity of the material comprising mullite may be increased by including kaolinite in the material. Mullite will react with chemically dehydrated kaolinite (also known as metakaolin) to form kyanite. This reaction results in a 1.85 percent molar volume decrease, which is relatively small and is unlikely to result in a substantial decrease in pressure.

Example containment elements may comprise a mixture of mullite and kaolinite in various amounts and proportions and having various different properties. In addition, the size distributions of the mullite and kaolinite powders may be altered to modify the properties of the containment element.

Aspects of the method of making containment elements according to this disclosure, such as the temperature at which the material of the containment element is cured and fired, as well binder content, may also be altered to change the electrical, thermal and mechanical properties, and to alter the response of the containment element to elevated pressure and temperature.

A capsule or containment assembly for manufacturing super-hard material will likely comprise various components, which may be for pressure containment, electrical insulation or conductivity, thermal containment or conductivity and so forth.

A capsule or containment assembly for containing matter at ultra-high pressure and high temperature may comprise at least one containment element according to this disclosure as well as at least one other containment element comprising material such as sodium chloride (NaCl), magnesia (MgO), potassium salt, pyrophyllite, calcium fluoride ($CaF_2$), alumina ($Al_2O_3$), zirconia ($ZrO_2$), chromia ($Cr_2O_3$) and or talc. Such a capsule may be configured for containing a reaction compact for growing cBN or diamond crystals or for sintering cBN or diamond crystals to manufacture a body comprising PCBN or PCD material. The reaction compact may comprise solvent and or catalyst material such as cobalt, iron, nickel, manganese for promoting the growth or inter-growth of diamond crystals, or a lithium-containing compound for promoting the growth of cBN crystals, or compounds containing titanium such as titanium carbide or titanium carbonitride, or an aluminium containing compound or elemental aluminium for sintering cBN grains to make PCBN.

A capsule for a belt type ultra-high press apparatus may comprise a tube for inserting into a die, which may comprise cemented carbide material and for containing a generally cylindrical reaction compact. In such an apparatus, pressure may be generated in the reaction compact by impinging a pair of oppositely travelling anvils onto opposite ends of the capsule.

A capsule for a cubic type ultra-high pressure press may comprise a generally cubic structure for insertion into a chamber defined by a cubic press apparatus. The apparatus may comprise six hydraulic cartridges each comprising a carbide anvil, arranged for impinging on the capsule on six sides.

Analogously, other ultra-high pressure systems and corresponding capsule configurations are envisaged, including tetrahedral systems comprising four hydraulic cartridges and respective anvils.

Non-limiting example containment elements are described in more detail below.

EXAMPLE 1

A cylinder for a capsule for a belt type ultra-high pressure furnace may be formed by mixing powdered talc, powdered mullite and sodium silicate dissolved in water as a binder, in a blender. The mixture may comprise 75 weight percent talc, 15 weight percent mullite and 10 weight percent sodium silicate solution, the latter with a solids content of approximately 45 weight percent.

When a homogeneous granular blend is obtained, the mixture may be packed into a deformable cylindrical mould with a central rod and compacted in an isostatic press at 150 MPa. The rough compacted tube may then fired at a temperature of 800 degrees centigrade for six hours, cooled and machined to final size.

The resulting high density, high strength cylinder may be used as the outer insulating and pressure transmitting medium in a uniaxial ultra-high pressure generating apparatus for the production of synthetic diamond at 5.7 GPa and 1,300 degrees centigrade.

EXAMPLE 2

A cylinder for a capsule for a belt type ultra-high pressure furnace may be formed by mixing powdered talc, powdered kyanite and sodium silicate dissolved in water as a binder, in a blender. The mixture may comprise 70 weight percent talc, 20 weight percent kyanite and 10 weight percent sodium silicate solution, the latter with a solids content of approximately 45 weight percent.

When a homogeneous blend is obtained, the mixture may be packed into a deformable cylindrical mould with a central rod and compacted in an isopress at 180 MPa. The rough compacted tube may then be fired at a temperature of 800 degrees centigrade for six hours, cooled and machined to final size.

The resulting high density, high strength cylinder may be used as the inner insulating and pressure transmitting medium in a uniaxial ultra-high pressure generating apparatus for the production of synthetic diamond at 5.7 GPa and 1,300 degrees centigrade.

EXAMPLE 3

A cubic component for a capsule for a cubic type ultra-high pressure press may be formed by mixing powdered talc, powdered kyanite, powdered mullite and sodium silicate dissolved in water as a binder, in a blender. The mixture may comprise 65 weight percent talc, 7 weight percent kyanite, 18 weight percent mullite and 10 weight percent sodium silicate solution, the latter with a solids content of approximately 45 weight percent.

When a homogeneous blend is obtained, the mixture may be packed into a deformable cubic mould with a central rod and compacted in an isopress at 180 MPa. The roughly compacted cube with cylindrical hole may then be cured at a temperature of 200 degrees centigrade for six hours, cooled and machined to final size and shape.

The resulting high density cube may then be used as the combined insulating, pressure transmitting and gasket medium in a cubic ultra-high pressure generating press system for the production of synthetic diamond at 5.7 GPa and 1,300 degrees centigrade. The properties of the talc, kyanite, mullite and binder mix are likely to be such as to give sufficient strength, thermal and electrical insulation and flow characteristics to operate successfully under these conditions.

EXAMPLE 4

A cubic component for a capsule for a cubic type ultra-high pressure press may be formed by mixing powder mullite, powder kaolinite and sodium silicate dissolved in water as a binder, in a blender. The mixture may comprise 50 weight percent kaolinite, 40 weight percent mullite and 10 weight percent sodium silicate solution, the latter with a solids content of approximately 45 weight percent.

When a homogeneous blend is obtained, the mixture may be packed into a deformable cubic mould with a central rod and compacted in an isopress at 180 MPa. The roughly compacted cube with cylindrical hole may then be cured at a temperature of 200 degrees centigrade for six hours, cooled and machined to final size and shape.

The resulting high density cube may then be used as the combined insulating, pressure transmitting and gasket medium in a cubic ultra-high pressure generating press system for the production of synthetic diamond at 5.7 GPa and 1,300 degrees centigrade.

Certain terms as used herein will be briefly explained below.

Hard material has hardness at least that of silica.

Super-hard material has hardness at least that of cubic boron nitride (cBN), including natural or synthetic diamond crystals, polycrystalline cBN (PCBN) material, or polycrystalline diamond (PCD) material.

An ultra-high pressure, high temperature (HPHT) press can also be referred to as an ultra-high pressure furnace and is capable of subjecting a body to an ultra-high pressure and high temperature. As used herein, ultra-high pressure is at least about 1 GPa.

The invention claimed is:

1. A containment element for a pressure containment assembly for containing matter at a pressure of at least 1 gigapascal (GPa), comprising 10 to 80 weight percent mullite, at least 20 weight percent talc and at most 15 weight percent silicate compounds; other than the mullite and the talc; in which the containment element comprises a gasket.

2. A containment element as claimed in claim 1, comprising kaolinite.

3. A containment element as claimed in claim 1, comprising kyanite.

4. A containment element as claimed in claim 1, comprising cordierite.

5. A containment element as claimed in claim 1, comprising binder material.

6. A containment element as claimed in claim 1, comprising at least 5 weight percent silica.

7. A containment element as claimed in claim 1, free from magnesium carbonate or precursor material for magnesium carbonate.

8. A containment element as claimed in claim 1, comprising at least 5 weight percent kyanite.

9. A containment element as claimed in claim 1, for an assembly for containing matter at a pressure of at least 1 GPa and a temperature of at least 1,000 degrees centigrade.

10. A containment element as claimed in claim 1, comprising grains of a first hard material having a first internal friction and grains of a second hard material having a second internal friction.

11. A containment element as claimed in claim 10, in which the second hard material is a different phase of the first hard material.

12. A containment assembly for containing matter at an ultra-high pressure, comprising a containment element as claimed in claim 1.

13. A containment assembly as claimed in claim 12, for a belt type ultra-high pressure press.

14. A containment assembly as claimed in a claim 12, for a cubic type ultra-high pressure press.

15. A containment assembly as claimed in claim 12, for a tetrahedral type ultra-pressure press.

16. A containment assembly as claimed in claim 12, comprising a gasket.

17. A containment assembly for containing matter at an ultra-high pressure, comprising a press apparatus for generating an ultra-high pressure, the press apparatus comprising a chamber for accommodating a capsule comprising a containment element as claimed in claim 1.

18. A method for subjecting a body to an ultra-high pressure and high temperature, the method including assembling the body into a capsule configured for accommodating the body and for insertion into a chamber of an ultra-high pressure furnace, in which the capsule comprises a containment element for a pressure containment assembly for containing matter at a pressure of at least 1 gigapascal (GPa), comprising 10 to 80 weight percent mullite, at least 20 weight percent talc and at most 15 weight percent silicate compounds; other than the mullite and the talc; in which the containment element comprises a casket.

19. A method of making a containment element for a pressure containment assembly for containing matter at a pressure of at least 1 gigapascal (GPa), comprising 10 to 80 weight percent mullite, at least 20 weight percent talc and at most 15 weight percent silicate compounds other than the mullite and the talc, the method including combining mullite grains with at least a second material to form a granular blend, and compacting the granular blend to provide a green body; wherein the containment element comprises a casket.

20. A method as claimed in claim 19, including heat treating the green body to induce a phase change in the second material or remove moisture from the green body.

21. A method as claimed in claim 19, in which the second material is talc and the method includes heat treating the green body to induce a phase change in the talc.

* * * * *